US009385385B2

(12) United States Patent
Kim et al.

(10) Patent No.: US 9,385,385 B2
(45) Date of Patent: *Jul. 5, 2016

(54) COOLING SYSTEM FOR ECO-FRIENDLY VEHICLE

(71) Applicants: Hyundai Motor Company, Seoul (KR); Kia Motors Corporation, Seoul (KR)

(72) Inventors: Jaeyeon Kim, Hwaseong-si (KR); Manhee Park, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 88 days.

This patent is subject to a terminal disclaimer.

(21) Appl. No.: 14/286,749

(22) Filed: May 23, 2014

(65) Prior Publication Data

US 2014/0250934 A1 Sep. 11, 2014

Related U.S. Application Data

(62) Division of application No. 12/906,782, filed on Oct. 18, 2010, now Pat. No. 8,763,418.

(30) Foreign Application Priority Data

Dec. 3, 2009 (KR) .................. 10-2009-0119135

(51) Int. Cl.
*B60H 1/00* (2006.01)
*H01M 8/04* (2016.01)
(Continued)

(52) U.S. Cl.
CPC ....... *H01M 8/04731* (2013.01); *B60H 1/00278* (2013.01); *F01P 3/18* (2013.01);
(Continued)

(58) Field of Classification Search
CPC ................ B60H 1/00278; B60H 2001/00307; B60H 1/00321; B60H 1/00357; B60H 1/00457; B60H 1/00; H01M 8/04731; H01M 8/04029; H01M 8/04074; F01P 2003/187; F01P 2060/14; F01P 3/18; F01P 2050/24; B60K 2001/005; Y02E 60/50; Y02T 10/88
USPC ................................ 62/259.2, 434, 309, 426
See application file for complete search history.

(56) References Cited

U.S. PATENT DOCUMENTS 3,905,884 A 9/1975 Parenti, Jr. et al.
6,045,934 A 4/2000 Enami
(Continued)

FOREIGN PATENT DOCUMENTS

CN 101521287 A 9/2009
EP 1 289 039 A2 3/2003
(Continued)

*Primary Examiner* — Mohammad M Ali
(74) *Attorney, Agent, or Firm* — Morgan, Lewis & Bockius LLP

(57) ABSTRACT

A cooling system for an eco-friendly vehicle, may include an unified radiator that cools working fluid flowing therethrough to cool an electric power component and an air-cooling type AC condenser, respectively, a pump that is disposed in a series with the unified radiator to pump up the working fluid in the unified radiator to the electric power component or the water-cooling type AC condenser, a first branch pipe and a second branch pipe that connect the electric power components with the water-cooling type AC condenser in parallel for the unified radiator and the pump, and a valve connected to the first and second branch pipes and disposed to selectively supply the working fluid from the pump to the first branch pipe and the second branch pipe.

7 Claims, 6 Drawing Sheets

(51) Int. Cl.
   *F01P 3/18* (2006.01)
   *B60K 1/00* (2006.01)

(52) U.S. Cl.
   CPC ..... *H01M 8/04029* (2013.01); *H01M 8/04074* (2013.01); *B60H 2001/00307* (2013.01); *B60K 2001/005* (2013.01); *F01P 2003/187* (2013.01); *F01P 2050/24* (2013.01); *F01P 2060/14* (2013.01); *Y02E 60/50* (2013.01); *Y02T 10/88* (2013.01)

(56) References Cited

U.S. PATENT DOCUMENTS

| | | | |
|---|---|---|---|
| 6,370,903 | B1 | 4/2002 | Wlech |
| 6,429,019 | B1 | 8/2002 | Goldstein et al. |
| 6,569,550 | B2 | 5/2003 | Khelifa |
| 6,584,789 | B2 | 7/2003 | Ishikawa |
| 7,051,787 | B2 | 5/2006 | Taguchi |
| 7,150,159 | B1* | 12/2006 | Brummett ........ B60H 1/00378 62/236 |
| 7,259,469 | B2* | 8/2007 | Brummett ........... B60H 1/3226 165/202 |
| 7,735,461 | B2 | 6/2010 | Vetrovec |
| 8,216,736 | B2 | 7/2012 | Kwon |
| 8,470,480 | B2 | 6/2013 | Perry et al. |
| 2001/0045103 | A1 | 11/2001 | Khelifa |
| 2002/0073726 | A1* | 6/2002 | Hasebe ............... B60K 1/02 62/323.1 |
| 2004/0033136 | A1* | 2/2004 | Bettencourt ........ F04D 27/002 416/1 |
| 2004/0134204 | A1* | 7/2004 | Honda ................ B60H 1/004 62/134 |
| 2004/0194912 | A1* | 10/2004 | Honda ................ B60H 1/004 165/42 |
| 2005/0000473 | A1 | 1/2005 | Ap et al. |
| 2005/0035657 | A1* | 2/2005 | Brummett ........... B60H 1/3226 307/10.1 |
| 2005/0072553 | A1* | 4/2005 | Tigner ................ B60H 1/3232 165/42 |
| 2006/0278365 | A1* | 12/2006 | Sanada ............... F28F 9/002 165/41 |
| 2007/0144713 | A1* | 6/2007 | Sugimoto ........... F28D 1/0452 165/140 |
| 2007/0231639 | A1 | 10/2007 | Yoshida |
| 2007/0292724 | A1 | 12/2007 | Gilchrist |
| 2008/0006045 | A1* | 1/2008 | Brummett ........... B60H 1/3226 62/236 |
| 2008/0034767 | A1* | 2/2008 | Ziehr ................ B60H 1/00385 62/180 |
| 2008/0131741 | A1 | 6/2008 | Tabuchi |
| 2008/0223559 | A1 | 9/2008 | Morita |
| 2009/0068520 | A1 | 3/2009 | Wake |
| 2009/0136804 | A1 | 5/2009 | Bono |
| 2009/0191437 | A1 | 7/2009 | Maeshima |
| 2009/0217655 | A1* | 9/2009 | Yabuki .................. F01P 7/044 60/456 |
| 2009/0253007 | A1 | 10/2009 | Mergler |
| 2009/0274940 | A1 | 11/2009 | Morita |
| 2009/0305099 | A1 | 12/2009 | Chowdhury |
| 2010/0003568 | A1 | 1/2010 | Sugawara |
| 2010/0035095 | A1 | 2/2010 | Taniguchi |

FOREIGN PATENT DOCUMENTS

| | | |
|---|---|---|
| EP | 1 265 305 A3 | 12/2007 |
| JP | 08-258548 A | 10/1996 |
| JP | 11-107748 A | 4/1999 |
| JP | 11-170848 A | 6/1999 |
| JP | 2002-367645 A | 12/2002 |
| JP | 2004-189069 A | 7/2004 |
| JP | 2004-203289 A | 7/2004 |
| JP | 2005-35476 A | 2/2005 |
| JP | 2005-104404 A | 4/2005 |
| JP | 2005-125818 A | 5/2005 |
| JP | 2005-186879 A | 7/2005 |
| JP | 2005-257205 A | 9/2005 |
| JP | 2005-306300 A | 11/2005 |
| JP | 2006-059573 A | 3/2006 |
| JP | 2006-199206 A | 8/2006 |
| JP | 2006-327325 A | 12/2006 |
| JP | 2007-099239 A | 4/2007 |
| JP | 2007-186047 A | 7/2007 |
| JP | 2008-56152 A | 3/2008 |
| JP | 2008-126917 A | 6/2008 |
| JP | 2008-173992 A | 7/2008 |
| JP | 2008-251216 A | 10/2008 |
| JP | 2010-173357 A | 8/2010 |
| KR | 10-2004-0018252 A | 3/2004 |
| KR | 10-2005-0027720 A | 3/2005 |
| KR | 10-2005-0089176 A | 9/2005 |
| KR | 10-2006-0028594 A | 3/2006 |

* cited by examiner

COOLING SYSTEM FOR ECO-FRIENDLY VEHICLE

CROSS-REFERENCE TO RELATED APPLICATIONS

The present application is a Divisional of U.S. Patent application Ser. No. 12/906,782, filed Oct. 18, 2010, which claims priority to Korean Patent Application Number 10-2009-0119135 filed Dec. 3, 2009, the entire contents of which applications are incorporated herein for all purposes by this reference.

BACKGROUND OF THE INVENTION

1. Field of the Invention

The present invention relates to a cooling system for an eco-friendly vehicle, in more detail, a stack and electric power components of a fuel cell vehicle.

2. Description of Related Art

Fuel cells have the advantage of generating electricity without environmental pollution, because they produce little air pollutants and carbon dioxide, and also have higher electricity generation efficiency than thermal power generation of the related art, such that eco-friendly vehicles using a fuel cell as the power source have been increasingly developed.

Hybrid vehicles can appropriately use power from a motor and an engine to drive the vehicles in accordance with traveling conditions of the vehicles, and the technology of driving a vehicle with a motor is necessary for the fuel cell vehicles.

It is a problem in driving a vehicle with a motor to dissipate heat generated by the operation of the motor and heat generated by phase change of current in an inverter.

Therefore, it is technologically necessary to cool electric power components, such as the motor and the inverter, and effectively cool the stack of the fuel cell.

FIG. 1 is a diagram illustrating a cooling system of a fuel cell vehicle in the related art, which includes a cooling circuit composed of a water pump, a reservoir tank, and a radiator for cooling electric power components and a cooling circuit composed of a water pump, a reservoir tank, and a radiator for cooing a stack, in which an air-cooling type AC condenser is disposed between the radiators to cool an air conditioner with a cooling fan.

Further, the cooling system shown in FIG. 2 is a water-cooling type that cools the air conditioner with water, in which a separate cooling circuit composed of a water pump circulating cooling water to the water-cooling type air conditioner, a reservoir tank, and a radiator for cooling an air-con coolant is included and the radiator for cooling an air-con coolant is disposed between the stack-radiator and the electric power components-radiator to cool them with a cooling fan.

In the cooling systems in the related art, the configuration shown in FIG. 1 has difficulty in ensuring sufficient cooling performance, because the air-cooling type AC condenser increases ventilation resistance for the electric power components-radiator and the stack-radiator. In particular, the electric power components and the stack are operated at low temperature as compared with the existing internal combustion engines and a high-capacity radiator is required because the enthalpy is three times larger than the internal combustion engines, but the increase of thickness of the radiator increases ventilation resistance, such that a technology of optimizing this conditions is required.

On the other hand, the configuration shown in FIG. 2 has a problem that it has an adverse effect on weight, volume, and cost of a vehicle, because many parts, including the water pump and the reservoir, are unnecessarily used to separately form the cooling circuit for the stack, electric power components, and AC condenser.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a cooling system for an eco-friendly vehicle that minimizes ventilation resistance of radiators for cooling a stack and electric power components and ensures smooth and stable cooling performance for the stack, the electric power components, and an AC condenser, while reducing weight of the vehicle, volume of the parts, and cost, without using unnecessarily a number of parts, such as a water pump and a reservoir tank.

In an aspect of the present invention, the cooling system for an eco-friendly vehicle, may include an unified radiator that cools working fluid flowing therethrough to cool an electric power component and an air-cooling type AC condenser, respectively, a pump that is disposed in a series with the unified radiator to pump up the working fluid in the unified radiator to the electric power component or the water-cooling type AC condenser, a first branch pipe and a second branch pipe that connect the electric power components with the water-cooling type AC condenser in parallel for the unified radiator and the pump, and a valve connected to the first and second branch pipes and disposed to selectively supply the working fluid from the pump to the first branch pipe and the second branch pipe.

In another aspect of the present invention, the cooling system for an eco-friendly vehicle, may include an unified radiator that cools working fluid flowing therethrough to cool an electric power component and an AC condenser, respectively, a pump that is disposed in a series with the unified radiator to pump up a coolant in the unified radiator to the electric power component and the water-cooling type AC condenser, and a single coolant pipe that forms a single closed circuit by connecting in a series the water-cooling type AC condenser with the electric power components, for the unified radiator and the pump.

In further another aspect of the present invention, the cooling system for an eco-friendly vehicle, may include a unified radiator that cools working fluid flowing therethrough to cool a stack and an air-cooling type AC condenser, respectively, a pump that is disposed in a series with the unified radiator to pump up the working fluid in the unified radiator to the stack or the water-cooling type AC condenser, a first branch pipe and a second branch pipe that connect the stack with the water-cooling type AC condenser in parallel for the unified radiator and the pump, and a valve connected to the first branch pipe and the second branch pipe and disposed to supply the working fluid from the pump to the first branch pipe and the second branch pipe.

In an aspect of the present invention, the cooling system for an eco-friendly vehicle, may include an unified radiator that cools working fluid flowing therethrough to cool a stack and an AC condenser, respectively, a pump that is disposed in a series with the unified radiator to pump up the coolant in the unified radiator to the stack and the AC condenser, and a single coolant pipe that forms a single closed circuit by connecting in a series the water-cooling type AC condenser with the stack, for the unified radiator and the pump.

According to the present invention, it is possible to minimize ventilation resistance of radiators for cooling a stack and electric power components and ensure smooth and stable cooling performance for the stack, the electric power components, and an AC condenser, while reducing weight of the vehicle, volume of the parts, and cost, without using unnecessarily a number of parts, such as a water pump and a reservoir tank.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
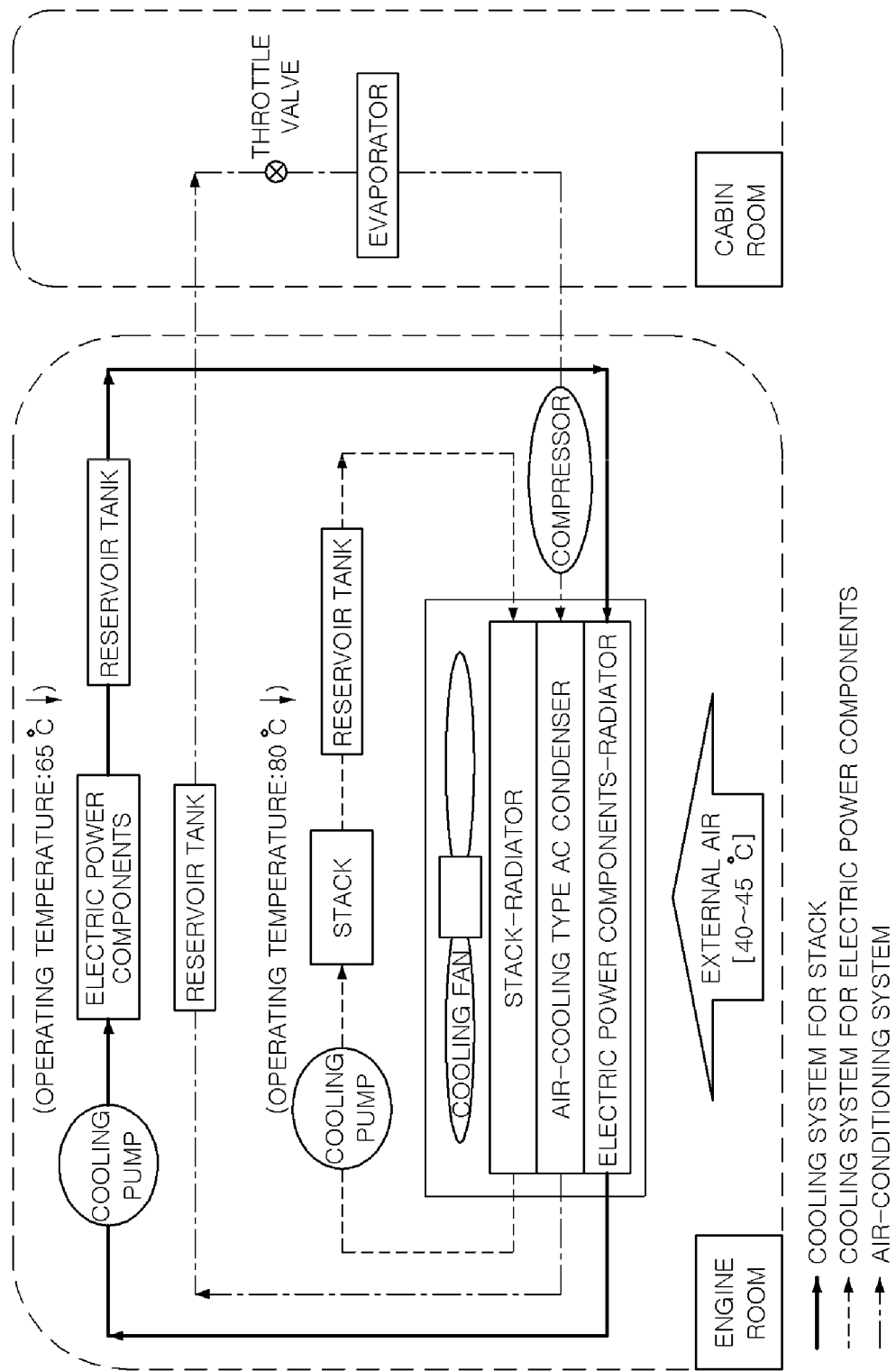
FIGS. 1 and 2 are diagrams illustrating embodiments of a cooling system for an eco-friendly vehicle in the related art.
Figure 2:
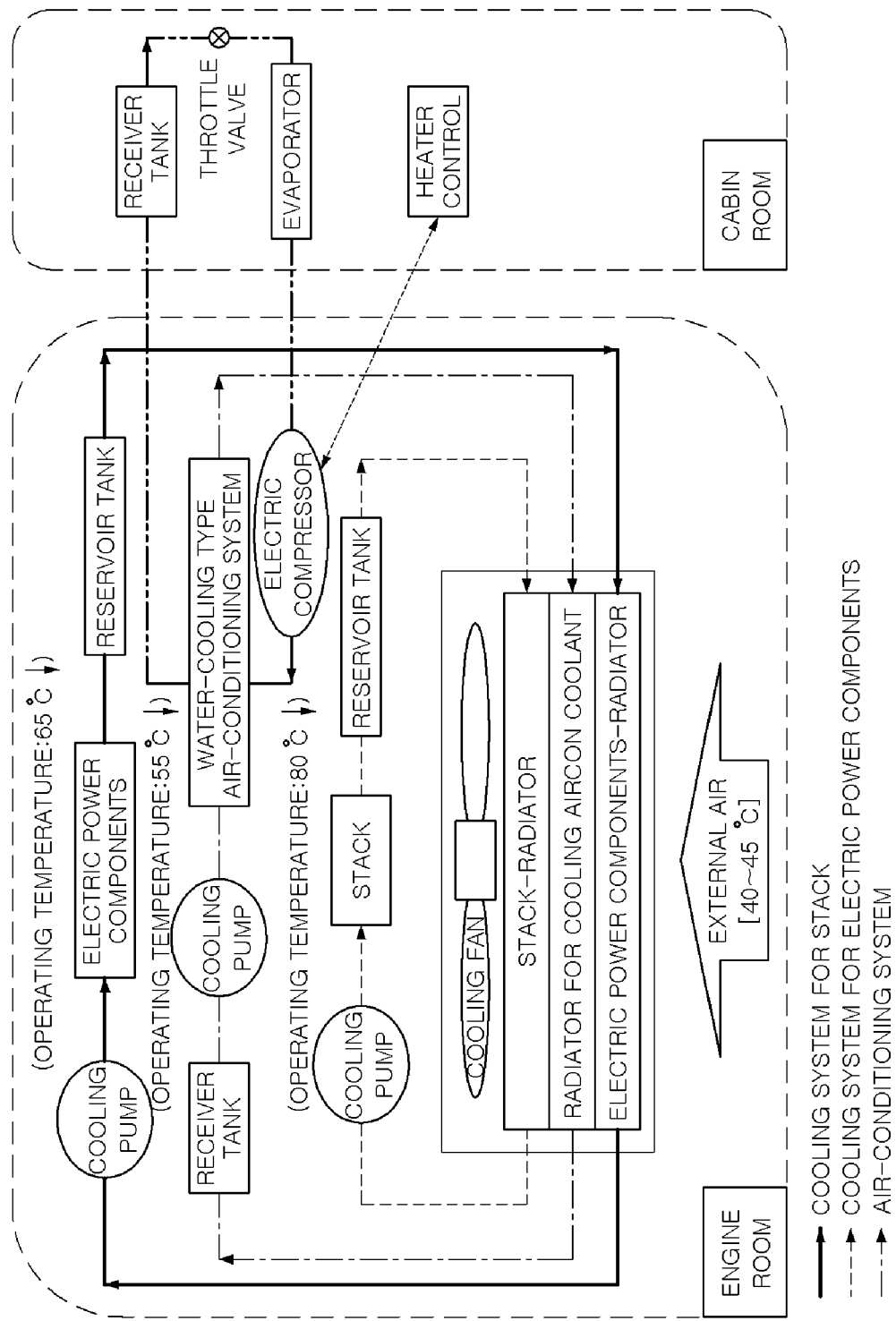

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
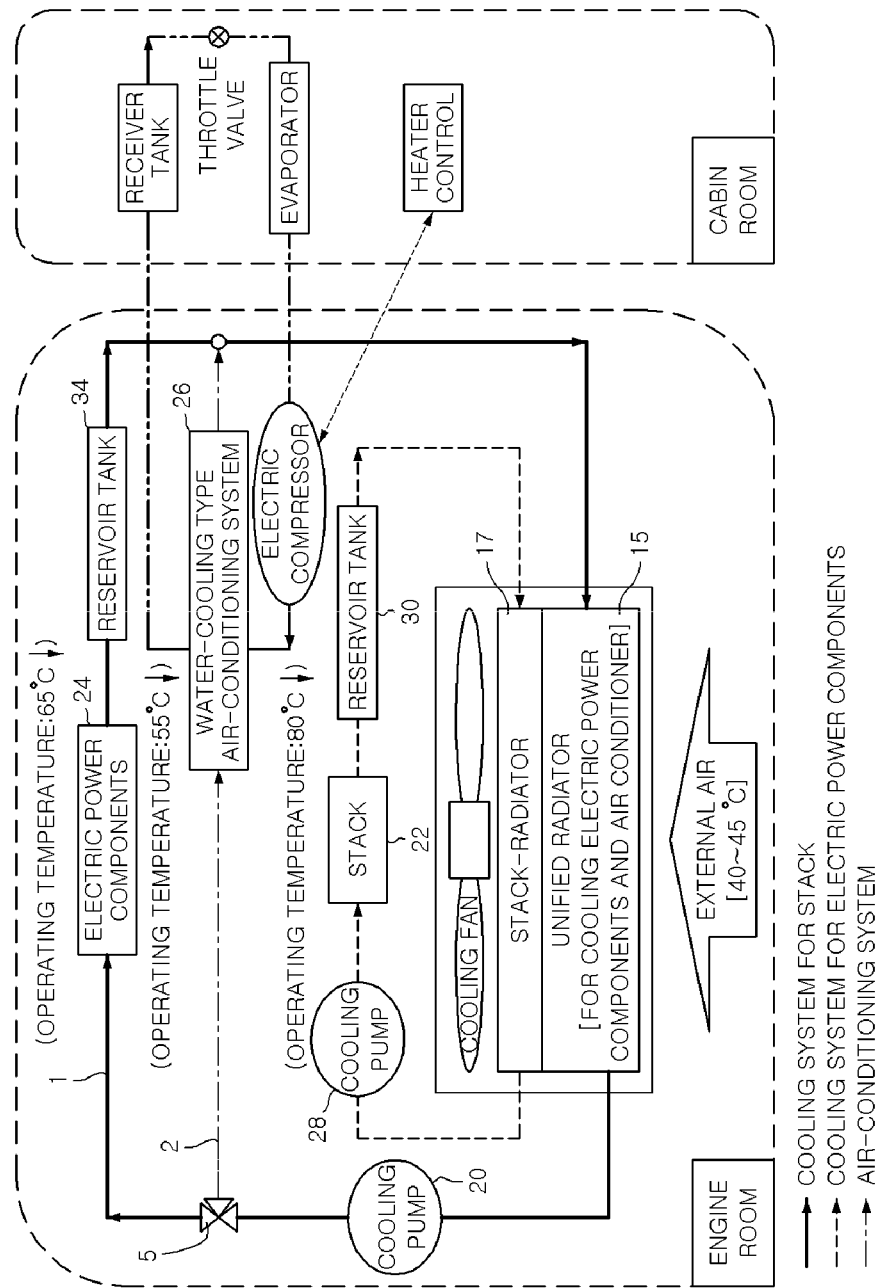
FIGS. 3 to 6 are diagrams illustrating embodiments of a cooling system for an eco-friendly vehicle according to the present invention.

Referring to FIG. 3, a first embodiment of the present invention includes an unified radiator 15 that cools all of working fluid flowing therethrough to cool electric power components 24 and an air-cooling type AC condenser 26 respectively, a pump 20 that is disposed in a series with the unified radiator 15 to pump up the working fluid in the unified radiator 15 to the electric power components 24 or the water-cooling type AC condenser 26, a first branch pipe 1 and a second branch pipe 2 that connect the electric power components 24 with the water-cooling type AC condenser 26 in parallel for the unified radiator 15 and the pump 20, and a valve 5 that is disposed to appropriately supply the working fluid from the pump 20 to first branch pipe 1 and second branch pipe 2.

That is, the single unified radiator 15 is formed by unifying a radiator for cooling the air-cooling type AC condenser 26 and a radiator for cooling the electric power components 24-the radiators are separate in the related art-and valve 5 is provided to appropriately supply the cooling water cooled through the unified radiator 15 to first branch pipe 1 and second branch pipe 2.

The stack 22 also has a separate cooling circuit, that is, as shown in the figure, a cooling circuit including a stack-radiator 17, a coolant pump 28, and a reservoir tank 30.

The unified radiator 15 is positioned before the stack-radiator 17 cooling only the stack 22 and a cooling fan is positioned after the stack-radiator 17 such that cooling air passes through the stack-radiator 17 after passing through the unified radiator 15, in order that the cooling water cools first the unified radiator 15 for the electric power components 24 and AC condenser 26 and then cools the stack-radiator 17, because the operating temperature of the stack 22 is relatively high.

Further, the unified radiator 15 may be integrally formed with the stack-radiator 17 and may be formed such that only the channel for working fluid is separated.

The pump 20 is disposed between the unified radiator 15 and valve 5 to pump up the working fluid from the unified radiator 15 to valve 5 and a reservoir tank 34 storing the working fluid is positioned in the downstream of the electric power components 24 at first branch pipe 1. Further, a separate reservoir tank may be additionally provided in second branch pipe 2 and only one reservoir tank 34 may be positioned after first branch pipe 1 and second branch pipe 2 converge.

Valve 5 may be a flow control valve that can independently control flow rate of the working fluid flowing to first branch pipe 1 and the working fluid flowing to second branch pipe 2, such that it can improve performance of cooling the electric power components 24 by controlling flow rate of the supplied working fluid in accordance with load of the electric power components 24 and air conditioner to reduce thermal load of the water-cooling type air-conditioning system, if needed.

Further, in high-temperature and low-speed traveling or idling where the load of the air conditioner is the highest, thermal load of the electric power components 24 is relatively small, such that the temperature of the cooling water flowing into the water-cooling type AC condenser 26 becomes low and the pressure of the air conditioner is reduced or the compression work of an electric compressor is reduced, thereby contributing to improve fuel efficiency.

Further, it is possible to reduce the number of pumps and the reservoir tanks in the system described above, as compared with when a cooling circuit for electric power components and a cooling circuit for a water-cooling type AC condenser are separately provided in the related art, such that it is possible to reduce weight of a vehicle, ensure a space for an engine room, and correspondingly reduce the cost of the vehicle.

Further, the unified radiator 15 described above increases in capacity relatively to the radiator for an electric device of the related art and slightly increases its own ventilation resistance, but the ventilation resistance less increases than that increased by separately providing an air-cooling type AC condenser or a radiator for cooling an air-con coolant of the related art, therefore, cooling efficiency can be expected to be improved due to reduction of ventilation resistance.

Figure 4:
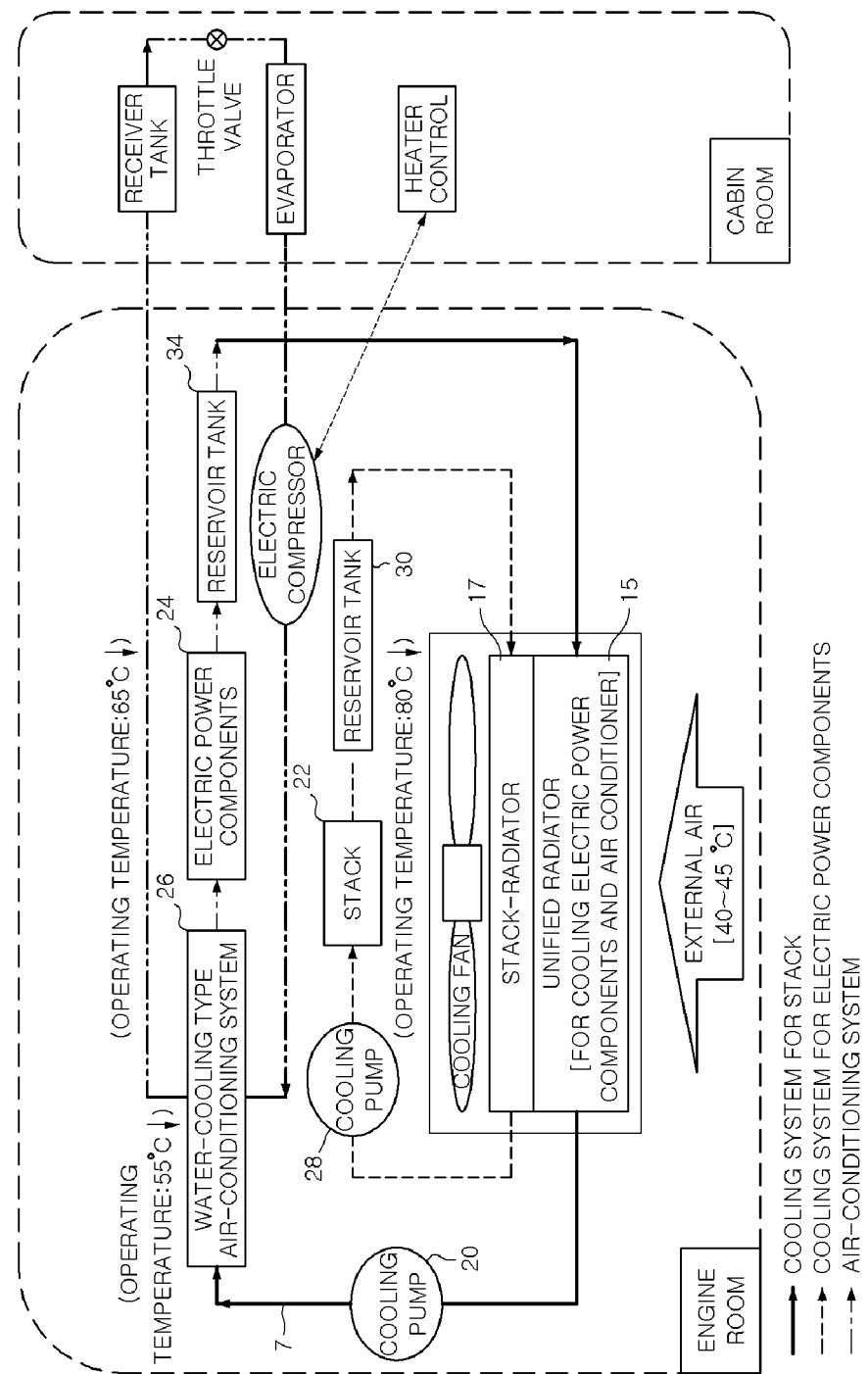

FIG. 4 shows a second embodiment of the present invention, which includes an unified radiator 15 that cools all of the working fluid flowing therethrough to cool electric power components 24 and an AC condenser 26, respectively, a pump 20 that is disposed in a series with the unified radiator 15 to pump up the coolant in the unified radiator 15 to the electric power components 24 and the water-cooling type AC condenser 26, and a single coolant pipe 7 that forms a single closed circuit by connecting in a series the water-cooling type AC condenser 26 with the electric power components 24, for the unified radiator 15 and the pump 20.

That is, as compared with the parallel type first embodiment, the series type embodiment allows the working fluid passing through the unified radiator 15 to be pumped up by the pump 20 and sequentially cool the water-cooling type AC condenser 26 and the electric power components 24.

The pump 20 is positioned between the unified radiator 15 and the water-cooling type AC condenser 26 to pump up the working fluid in the unified radiator 15 to the water-cooling type AC condenser 26.

Further, the AC condenser 26 is positioned in the upstream of the electric power components 24 at single coolant pipe 7 and a reservoir tank 34 storing the working fluid is positioned in the downstream of the electric power components 24 at single coolant pipe 7.

This configuration is for the working fluid to cool the electric power components 24 after cooling the AC condenser 26, because the operating temperature of the water-cooling type AC condenser 26 is lower than that of the electric power components 24.

In the present embodiment, it is possible to improve performance of cooling the electric power components, by adjusting the revolution number of an electric compressor that compresses the working fluid of the air conditioner at a low level in accordance with the operating temperature of the electric power components 24 to reduce thermal load of the air-conditioning system 26.

Further, in high-temperature and low-speed traveling or idling where the load of the air-conditioner is the highest, thermal load of the electric power components 24 is relatively small, such that the temperature of the cooling water flowing into the water-cooling type AC condenser 26 becomes low and the pressure of the air-conditioner is reduced or the compression work of an electric compressor is reduced, thereby contributing to improve fuel efficiency.

The unified radiator 15 may also be integrally formed with the stack-radiator 17 for cooling only the stack 22 such that only the channel for the working fluid is separated.

Figure 5:
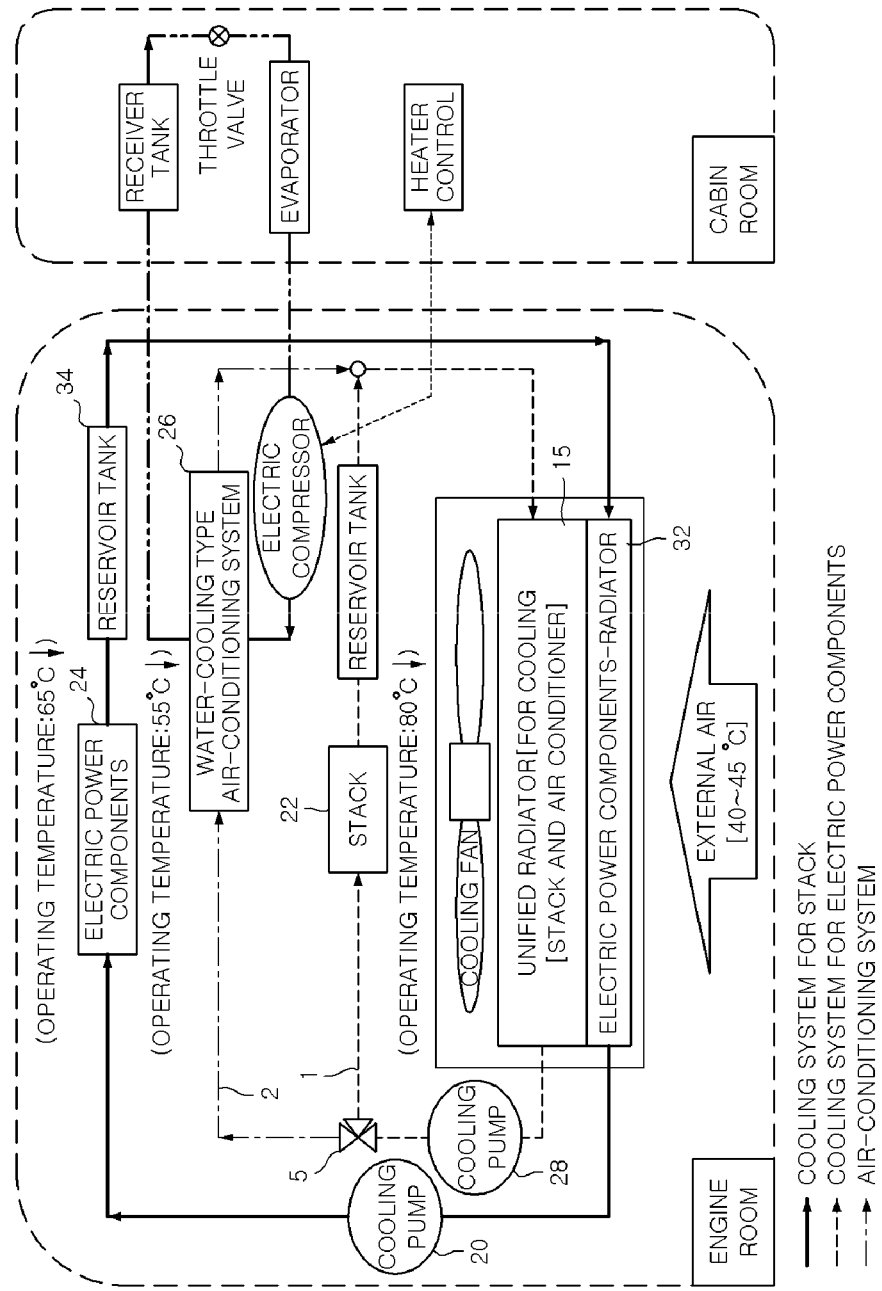

FIG. 5 shows a third embodiment of the present invention, which includes an unified radiator 15 that cools all of the working fluid flowing therethrough to a stack 22 and an air-cooling type AC condenser 26, respectively, a pump 28 that is disposed in a series with the unified radiator 15 to pump up the coolant in the unified radiator 15 to the stack 22 or the water-cooling type AC condenser 26, a first branch pipe 1 and a second branch pipe 2 that connects the stack 22 with the water-cooling type AC condenser 26 in parallel for the unified radiator 15 and the pump 28, and a valve 5 that is disposed to appropriately supply the coolant from the pump 28 to first branch pipe 1 and second branch pipe 2.

That is, the single unified radiator 15 is formed by unifying a radiator for cooling the air-cooling type AC condenser 26 and a radiator for cooling the stack-the radiators are separated in the related art-and valve 5 is provided to appropriately supply the working fluid cooled through the unified radiator 15 to first branch pipe 1 and second branch pipe 2.

The electric power components 24 also have a separate cooling circuit, that is, as shown in the figure, a cooling circuit including electric power components radiator 32, a pump 20, and a reservoir tank 34.

The unified radiator 15 is positioned after the electric power components-radiator 32 cooling only the electric power components 24 and a cooling fan is positioned after the unified radiator 15 such that cooling air passes through unified radiator 15 after passing through the electric power components-radiator 32, in order that the cooling water cools first the electric power components-radiator 32 and then cools the unified radiator 15, because the operating temperature of the stack 22 is relatively high.

Further, the unified radiator 15 is integrally formed with the electric power components-radiator 32 and may be formed such that the channel for working fluid is separated.

The pump 28 is disposed between the unified radiator 15 and valve 5 to pump up the working fluid from the unified radiator 15 to valve 5 and a reservoir tank 30 storing the working fluid is positioned in the downstream of the stack 22 at first branch pipe 1. Further, a separate reservoir tank may be additionally provided in second branch pipe 2 and only one reservoir tank may be positioned after first branch pipe 1 and second branch pipe 2 converge.

Valve 5 may be a flow control valve that can independently control flow rate of the working fluid flowing to first branch pipe 1 and the working fluid flowing to second branch pipe 2, such that it can improve performance of cooling the stack 22 by controlling flow rate of the working fluid supplied to the AC condenser 26 in accordance with operating temperature of the stack 22 to reduce thermal load of the water-cooling type air-conditioning system, if needed.

Further, in high-temperature and low-speed traveling or idling where the load of the air-conditioner is the highest, thermal load of the stack 22 is relatively small, such that the temperature of the cooling water flowing into the water-cooling type AC condenser 26 becomes low and the pressure of the air-conditioner is reduced or the compression work of an electric compressor is reduced, thereby contributing to improve fuel efficiency.

Further, it is possible to reduce the number of pumps and the reservoir tanks in the system described above, as compared with when a cooling circuit for stack and a cooling circuit for a water-cooling type AC condenser are separately provided in the related art, such that it is possible to reduce weight of a vehicle, ensure a space for an engine room, and correspondingly reduce the cost of the vehicle.

Further, the unified radiator 15 described above increases in capacity relatively to the stack-radiator of the related art and slightly increases its own ventilation resistance, but the ventilation resistance less increases than that increased by providing an air-cooling type AC condenser or a radiator for cooling an air-con coolant of the related art, therefore, cooling efficiency can be expected to be improved due to reduction of ventilation resistance.

Figure 6:
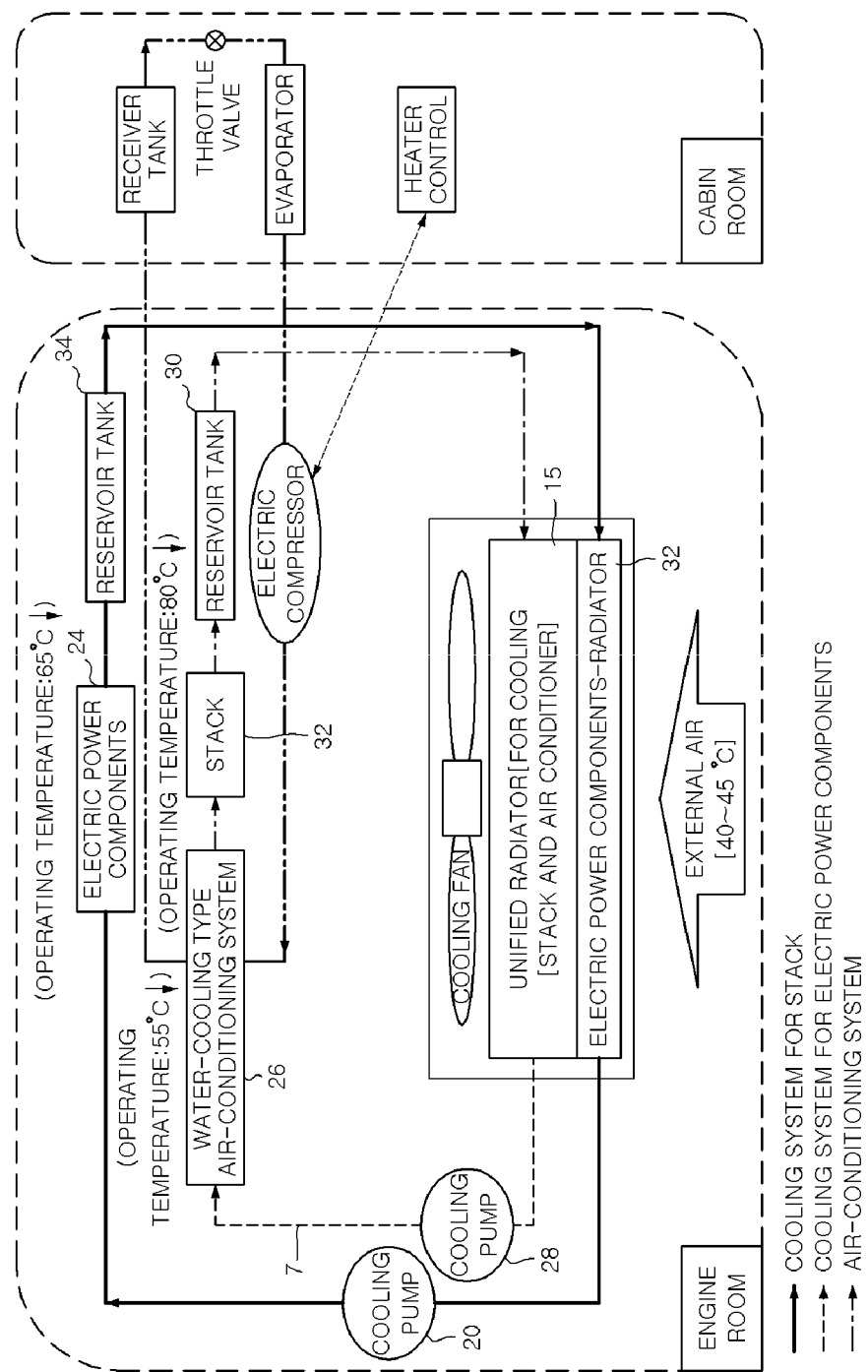

FIG. 6 shows a fourth embodiment of the present invention, which includes an unified radiator 15 that cools working fluid flowing therethrough to cool a stack 22 and a water-cooling type AC condenser 26, respectively, a pump 28 that is disposed in series with the unified radiator 15 to pump up the coolant in the unified radiator 15 to the stack 22 and the water-cooling type AC condenser 26, and a single coolant pipe 7 that forms a single closed circuit by connecting in a series the water-cooling type AC condenser 26 with the stack 22, for the unified radiator 15 and the pump 28.

That is, as compared with the parallel type third embodiment, the series type embodiment allows the working fluid passing through the unified radiator 15 to be pumped up and sequentially cool the water-cooling type AC condenser 26 and the stack 22.

The pump 28 is positioned between the unified radiator 15 and the water-cooling type AC condenser 26 to pump up the working fluid from the unified radiator 15 to the water-cooling type AC condenser 26.

Further, the water-cooling type AC condenser 26 is positioned in the upstream of the stack 22 at single coolant pipe 7 and a reservoir tank 30 storing the working fluid is positioned in the downstream of the stack 22 at single coolant pipe 7.

This configuration is for the coolant to cool the stack 22 after cooling the AC condenser 26, because the operating temperature of the water-cooling type AC condenser 26 is lower than that of the stack 22.

In the present embodiment, it is possible to improve performance of cooling the stack 22, by adjusting the revolution number of an electric compressor that compresses the coolant of the air conditioner at a low level in accordance with the operating temperature of the stack 22 to reduce enthalpy of the air-conditioning system.

Further, in high-temperature and low-speed traveling or idling where the load of the air-conditioner is the highest, thermal load of the stack 22 is relatively small, such that the temperature of the cooling water flowing into the water-cooling type AC condenser 26 becomes low and the pressure of the air-conditioner is reduced or the compression work of an electric compressor is reduced, thereby contributing to improve fuel efficiency.

The unified radiator 15 may also be integrally formed with the electric power components-radiator 32 for cooling only the electric power components 24 such that only the channel for the working fluid is separated.

Further, the electric power components-radiator 32 for cooling only the electric power components 24 may be positioned before or in parallel with the unified radiator 15 in the third embodiment and the fourth embodiment.

For convenience in explanation and accurate definition in the appended claims, the terms "upper stream" and "down stream" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A cooling system for an eco-friendly vehicle, comprising:
    a unified radiator that cools working fluid flowing therethrough to cool a stack and an air-cooling type AC condenser, respectively;
    a pump that is disposed in a series with the unified radiator to pump up the working fluid in the unified radiator to the stack or the water-cooling type AC condenser;
    a first branch pipe and a second branch pipe that connect the stack with the water-cooling type AC condenser in parallel for the unified radiator and the pump; and
    a valve connected to the first branch pipe and the second branch pipe and disposed to supply the working fluid from the pump to the first branch pipe and the second branch pipe.

2. The cooling system for the eco-friendly vehicle as defined in claim 1, wherein the pump is positioned between the unified radiator and the valve and pumps up the working fluid from the unified radiator to the valve.

3. The cooling system for the eco-friendly vehicle as defined in claim 1, further comprising a reservoir tank that stores the working fluid under predetermined pressure, or using a specific atmosphere-open structure is positioned in the downstream of the stack at the first branch pipe.

4. The cooling system for the eco-friendly vehicle as defined in claim 1,
    wherein the unified radiator is positioned after the electric power components-radiator for cooling only the electric power component, and
    the cooling fan is positioned after the unified radiator such that the cooling air passes through the unified radiator after passing through the electric power component.

5. The cooling system for an eco-friendly vehicle as defined in claim 1, wherein the unified radiator is position in parallel above the electric power components-radiator for cooling only the electric power components.

6. The cooling system for an eco-friendly vehicle as defined in claim 1, wherein at least one or more reservoir tank storing the working fluid that flows is provided.

7. The cooling system for an eco-friendly vehicle as defined in claim 1, wherein the unified radiator is integrally formed with the electric power components-radiator for cooling only the electric power components such that only the channel for the working fluid is separated.

* * * * *